United States Patent
Xie et al.

(10) Patent No.: US 10,041,589 B2
(45) Date of Patent: Aug. 7, 2018

(54) CONTAINMENT CONTROL FOR A CONTINUOUSLY VARIABLE TRANSMISSION

(71) Applicant: GM Global Technology Operations LLC, Detroit, MI (US)

(72) Inventors: Zhe Xie, Rochester, MI (US); Vijay A. Neelakantan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 385 days.

(21) Appl. No.: 14/932,545

(22) Filed: Nov. 4, 2015

(65) Prior Publication Data
US 2016/0053889 A1    Feb. 25, 2016

Related U.S. Application Data

(62) Division of application No. 13/709,801, filed on Dec. 10, 2012, now Pat. No. 9,212,743.

(60) Provisional application No. 61/652,762, filed on May 29, 2012.

(51) Int. Cl.
*F16H 61/664* (2006.01)

(52) U.S. Cl.
CPC ....... *F16H 61/6649* (2013.01); *F16H 61/664* (2013.01); *F16H 61/6646* (2013.01); *F16H 61/6648* (2013.01)

(58) Field of Classification Search
CPC ............... F16H 61/6649; F16H 61/664; F16H 61/6646; F16H 61/6648
See application file for complete search history.

(56) References Cited

U.S. PATENT DOCUMENTS

| | | | |
|---|---|---|---|
| 8,321,105 B2* | 11/2012 | Dahl | F16H 61/472 180/65.7 |
| 8,353,799 B2* | 1/2013 | Takahashi | F16H 61/061 475/208 |
| 8,608,618 B1 | 12/2013 | Neelakantan et al. | |
| 8,858,389 B2 | 10/2014 | Lundberg et al. | |
| 8,888,645 B2 | 11/2014 | Xu | |
| 8,888,646 B2 | 11/2014 | Lundberg et al. | |
| 9,212,743 B2* | 12/2015 | Xie | F16H 61/6646 |
| 9,309,970 B2* | 4/2016 | Kamiyamaguchi | F16H 37/086 |
| 9,586,586 B1* | 3/2017 | Zhang | B60W 10/06 |
| 2002/0128110 A1* | 9/2002 | Shibukawa | F16H 37/086 475/214 |
| 2003/0229437 A1 | 12/2003 | Joe et al. | |
| 2004/0014556 A1 | 1/2004 | Fukuyama et al. | |
| 2007/0060441 A1* | 3/2007 | Kim | F16H 61/66254 477/45 |
| 2011/0015012 A1* | 1/2011 | Kajigaya | F16H 9/18 474/11 |

(Continued)

FOREIGN PATENT DOCUMENTS

JP    61-119866 A    6/1986

*Primary Examiner* — David M Fenstermacher

(57) ABSTRACT

A speed ratio containment process limits the speed ratio of a variator for a CVT for a motor vehicle when rolling backward by commanding a speed ratio that is higher than the actual speed ratio in an overdrive direction. Accordingly, the actual speed ratio moves to a lowest limit, which provides maximum torque when a driver of the motor vehicle steps on the accelerator pedal to resume forward motion of the motor vehicle.

6 Claims, 3 Drawing Sheets

(56) References Cited

U.S. PATENT DOCUMENTS

2013/0130859 A1\* 5/2013 Lundberg .............. F16H 37/022
    475/214
2013/0130863 A1  5/2013 Xu et al.
2013/0196805 A1\* 8/2013 Phillips .................. B60K 6/445
    475/5

\* cited by examiner

CONTAINMENT CONTROL FOR A CONTINUOUSLY VARIABLE TRANSMISSION

CROSS-REFERENCE TO RELATED APPLICATIONS

This application is a divisional of U.S. patent application Ser. No. 13/709,801, filed on Dec. 10, 2012, which claims the benefit of U.S. Provisional Application No. 61/652,762, filed May 29, 2012.

The entire contents of above applications are incorporated herein by reference.

FIELD

The present disclosure relates to continuously variable transmissions. More specifically, the present disclosure relates to containment control for continuously variable transmissions.

BACKGROUND

The statements in this section merely provide background information related to the present disclosure and may or may not constitute prior art.

A continuously variable transmission (CVT) typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc includes integrally formed gear teeth that are in mesh with and drive a corresponding gear. The gear in turn is functionally coupled to an output shaft or layshaft that is functionally coupled to the final drive unit.

In typical CVT designs, when the variator disk changes its rotational direction, the ratio control system changes from negative feedback to positive feedback, such that the actual ratio runs away from a desired command value. Therefore, there is a need in the art for a CVT design that allows for containment of the overall speed ratio.

SUMMARY

A speed ratio containment process limits the speed ratio of a variator for a CVT for a motor vehicle when rolling backward by commanding a speed ratio that is higher than the actual speed ratio in an overdrive direction. Accordingly, the actual speed ratio moves to a lowest limit, which provides maximum torque when a driver of the motor vehicle steps on the accelerator pedal to resume forward motion of the motor vehicle.

In another aspect, a method for speed ratio containment for a CVT includes transmitting a command signal to a motor associated with a ratio control subsystem and instructing the ratio control system with the command signal to provide a desired ratio control gain. The method may include transmitting a feedback signal to the initial command signal.

In yet another aspect, a method for a motor vehicle speed ratio containment for a CVT includes detecting an actual speed ratio, applying an offset to an overdrive direction of the detected actual speed ratio, and employing the offset as a command speed ratio. The method may be further characterized by one or any combination of features described herein, such as, for example: the actual speed ratio moves to a lowest limit, which provides a maximum torque when an accelerator for the motor vehicle is engaged to resume forward motion of the motor vehicle; the ratio containment is triggered when a variator reverse direction is detected; sensing the variator reverse direction by detecting an output shaft rotation direction; sensing the variator reverse direction by detecting a trunnion's shaft rotation direction; and sensing the variator reverse direction by identifying if a ratio control subsystem is behaving as a positive feedback system or a negative feedback system.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1A:
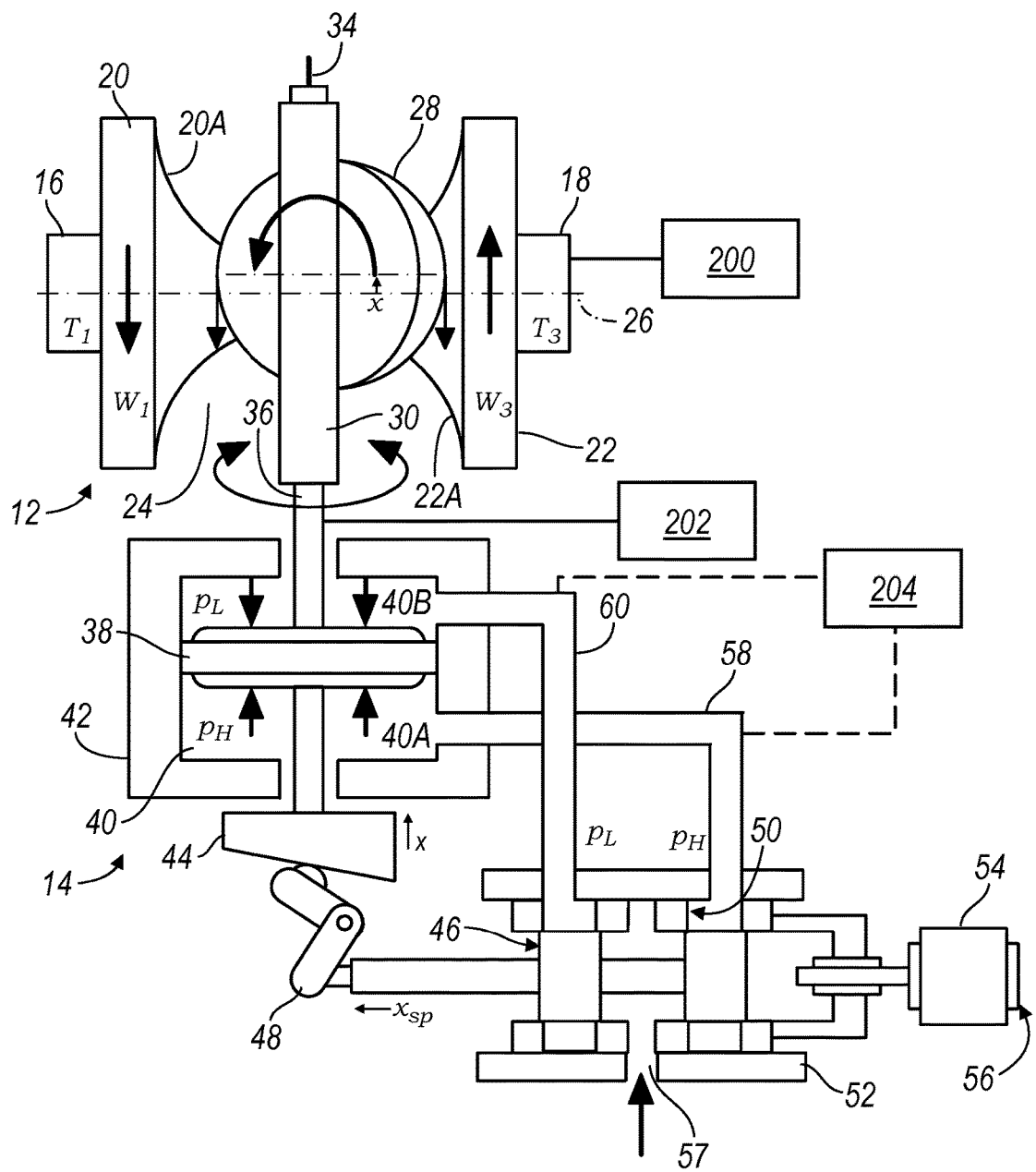
FIG. 1A is a schematic view of a variator with a ratio control subsystem for a continuously variable transmission in accordance with the principles of the present invention.
Figure 1B:
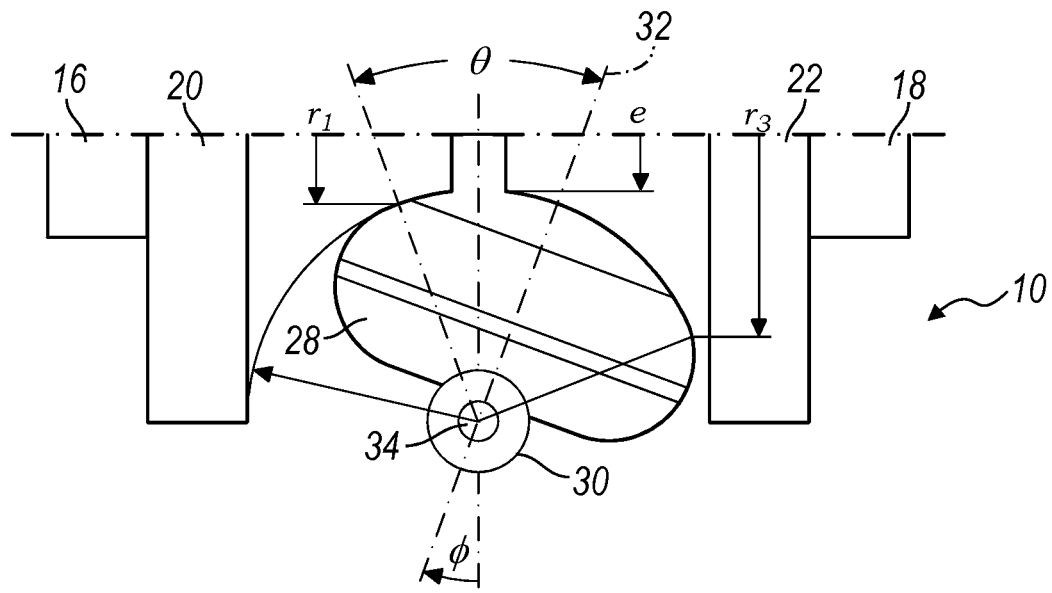
FIG. 1B is a side view of the variator of FIG. 1A.

Referring now to FIGS. 1A and 1B, a portion of a continuously variable transmission (CVT) for a motor vehicle is designated at 10. The CVT 10 includes a variator 12 and a ratio control subsystem 14. The variator 12 is generally coupled to an engine that provides input torque to the variator 12 and a drivetrain that supplies torque to the wheels of the motor vehicle. The engine may be a conventional internal combustion engine or an electric motor, or any other type of prime mover, without departing from the scope of the present disclosure.

The CVT 10 includes a typically cast, metal housing which encloses and protects the various components of the CVT 10. The housing includes a variety of apertures, passageways, shoulders and flanges which position and support these components. Generally speaking, the variator 12 includes an input shaft 16 and an output shaft 18. The input shaft 16 is functionally interconnected with the engine and receives input torque or power from the engine. The output shaft 22 is preferably connected with a final drive unit which may include, for example, a gear box, a propshaft, a differential assembly, and drive axles connected to wheels, etc. The gearbox generally includes one or more gear sets, clutches and/or brakes, and shafts to provide various forward and reverse gear ratios.

The variator 12 is illustrated as a toroidal race rolling type variator. However, it should be appreciated that various other types of variators may be employed without departing from the scope of the present invention. The variator 12 includes an input disc 20 and an output disc 22. The input disk 20 includes a toroidal outer surface or input race 20A and the output disk 22 includes a toroidal outer surface or output race 22A. The input race 20A and the output race 22A cooperate to define a toroidal cavity 24. Each of the disks 20 and 22 share a common rotational axis defined by a variator shaft 26. The input disk 20 and the output disk 22 are rotationally coupled to the variator shaft 26 with a roller 28. It should be appreciated that any number of rollers may be employed without departing from the scope of the present invention.

The roller 28 is mounted to a trunnion 30 for rotation about a roller axis 32 and rolls upon the toroidal races 20A and 22A of its associated input and output disks 20 and 22. Changes in variator torque ratio are achieved by precession of the roller 28 such that the roller's axis 32 is able to tilt about the trunnion axis 34 to change the inclination of the roller axis to the variator axis 26. Precession of the roller 28 results in changes of the radii of the path traced upon the races 20A and 22A by the roller 28 and hence results in a change of variator drive ratio between the input disk 20 and the output disk 22.

Figure 1C:
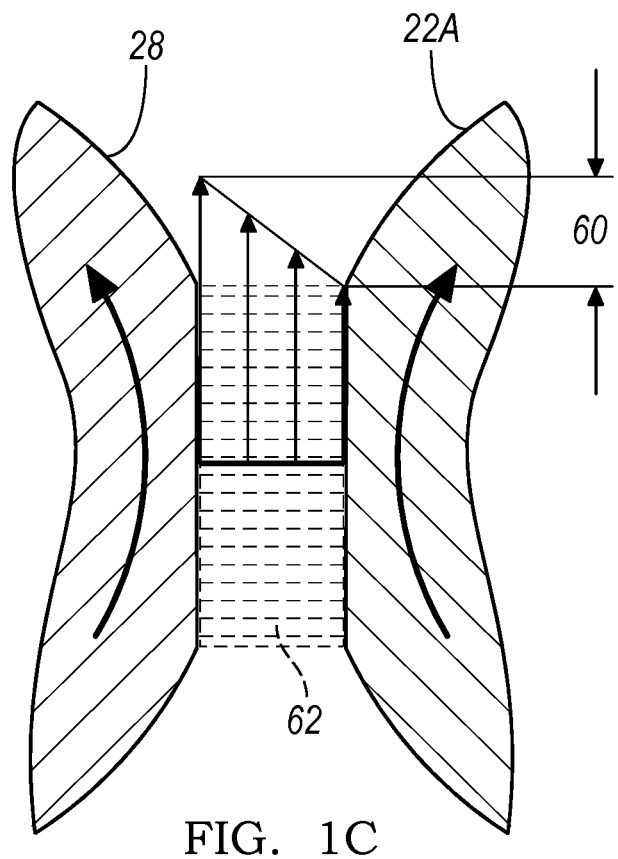
FIG. 1C is a close-up view of the region C in FIG. 1A.

The trunnion 30 of the variator 12 is connected to the ratio control subsystem 14 with a shaft 36. The ratio control subsystem 14 further includes a piston 38 mounted about the shaft 36. The piston 38 is disposed in a chamber 40 defined by the inner surface of a housing 42. The shaft 36 is further connected to a cam 44, which, in turn, is coupled to a spool through a link 48. It should be appreciated, however, that various other types of ratio control subsystem may be employed without departing from the scope of the present invention. Accordingly, as the piston 38 and hence the cam 44 move upward in the, x, direction, the spool 46 moves toward the left as shown in FIG. 1A. And as the cam 44 moves downward, the spool 46 moves to the right. The spool 46 reciprocates relative to a sleeve 50, both of which are enclosed in a housing 52. The sleeve 50 is coupled to a stepping motor 54 that receives command signals 56, which instruct the stepping motor 54 to move the sleeve to the right or to the left. Hence, the sleeve 50 and the spool 46 move independently of each other. The housing 52 includes an inlet 57 for pressurized gas or fluid and is coupled to the housing 42 with a pair of conduits or lines 58 and 60. The line 58 communicates with a subchamber 40A, and the line 60 communicates with a subchamber 40B. Note that FIG. 1C shows a close up region, C, between the 22A disk and the roller 28. Specifically, FIG. 1C shows slip 60 associated with a liquid, such as, for example, and oil film, disposed between the disk 22A and the roller 28.

Figure 2:
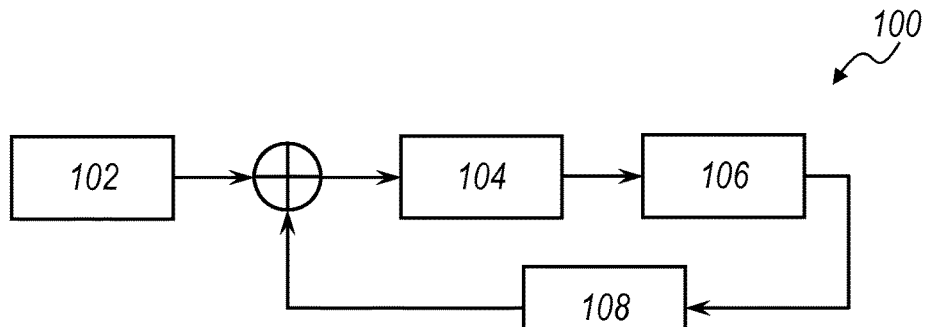
FIG. 2 is a block diagram illustrating a process for operating the variator control subsystem.

Referring also to FIG. 2, there is shown a block diagram of a process 100 for controlling the speed ratio of the variator 12. In a step 102, a command signal is delivered or transmitted to the stepping motor 54 which provides a desired ratio control gain 104 by moving the sleeve 50 to a particular position. The movement of the sleeve 50 closes or opens the lines 58 and 60 to adjust the pressure in the subchambers 40A and 40B so that the piston 38 moves up or down, which, in turn, moves the roller 28 relative to the disks 20 and 22 to provide an actual ratio 106. Note that as the roller 28 moves along the axis 34, the shaft 36 and hence the cam 44 move as well. Therefore, movement of the roller 28 moves the spool 46 to close or open the lines 58 and 60 so that the position of the spool 46 provides feedback 108 to the initial stepping motor position command 102.

In a normal operation, when the disks 20 and 22 are rotating in the indicated directions in FIG. 1A, once a speed ratio is selected, the difference between $P_L$ and $P_H$ is balanced with the tractive force on the roller 28, so that the axis 32 of the roller 28 stays in the center balanced position where x=0 and the roller is at a steady state tilt and a steady state ratio.

When the driver of the motor vehicle desires to change the speed of the vehicle, the command signal 56 is sent to the stepping motor 54. Hence, when the motor 54 move the sleeve 50 to the left, $P_H$ increases and $P_L$ decreases. This imbalance moves the roller 28 linearly upward along the axis 34 off the center position and causes the roller 28 to tilt about the trunnion axis 34 in a counterclockwise direction (that is, $r_3$ decreases and $r_1$ increases) because of the direction of the linear speed at the contact point so that the speed ratio $\omega_3/\omega_1$ increases. As the roller 28 moves upward and tilts counterclockwise, the shaft 36 and hence the cam 44 move upward and turns as well. Therefore, the link 48 and the spool 46 move towards the left so that $P_H$ decreases and $P_L$ increases, thereby again achieving a balanced situation or configuration where the roller 28 moves back to the center position along the axis 34.

Similarly, when the motor 54 moves the sleeve 50 to the right. $P_H$ decreases and $P_L$ increases. This imbalance moves the roller 28 linearly downward along the axis 34 off the center position and causes the roller 28 to tilt about the trunnion axis 34 in a clockwise direction (that is, $r_3$ increases and $r_1$ decreases) because of the direction of the linear speed at the contact point so that the speed ratio $\omega_3/\omega_1$ decreases. As the roller 28 moves downward and tilts clockwise, the shaft 36 and hence the cam 44 move downward and turns as well. Therefore, the link 48 and the spool 46 move towards the right so that $P_H$ increases and $P_L$ decreases, thereby again achieving a balanced situation where the roller 28 moves back to the center position along the axis 34. Accordingly, for the normal operation of the CVT 10, a higher position of the piston 38 increases the speed ratio and a lower position of the piston 38 decreases the speed ratio.

In some CVTs, the disk 22 reverses direction when the motor vehicle comes to a stop on a hill and then begins to roll backwards. When the output disk 22 rotates in a reversed direction (that is, opposite of the direction indicated in FIG. 1A), a higher position of the piston 38 results in an undesired decrease in the speed ratio and a lower position results in an undesired increase in the speed ratio. Specifically, in the situation in which the stepping motor moves the sleeve 50 to the left as described above so that the roller 28 moves upwards, the speed ratio $\omega_3/\omega_1$ actually decreases because the roller 28 rotates clockwise ($r_3$ increases and $r_1$ decreases) about the trunnion axis 34 when the disk 22 reverses direction; therefore, the link 48 and hence the spool 46 move to the right causing an even bigger difference between $P_H$ and $P_L$. And in the situation in which the stepping motor moves the sleeve 50 to the right as described above so that the roller 28 moves downwards, the speed ratio $\omega_3/\omega_1$ actually increases because the roller 28 tilts counterclockwise ($r_3$ decreases and $r_1$ increases) about the trunnion axis 34 when the disk 22 reverses direction; therefore, the link 48 and hence the spool 46 move to the left causing an even bigger difference between $P_H$ and $P_L$. In either of these undesirable situations, with a some CVTs, the spool 46 and the sleeve 50 move away from each other so that the piston 38 stays at either the top position or the bottom position when the disk 22 reverses direction, which eventually changes the ratio to the most underdrive or overdrive value where there are physical limits to the ratio.

Figure 3:
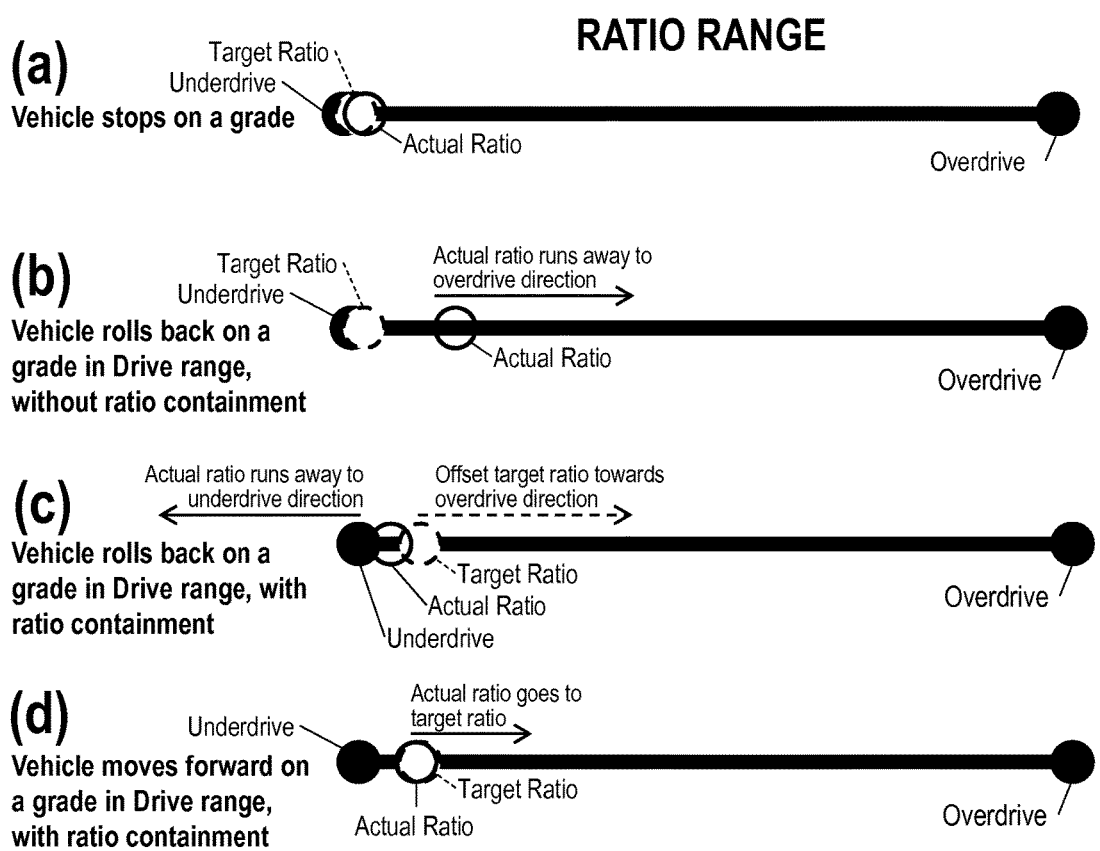
FIG. 3 illustrates a process of containing the overall speed ratio of the variator.

Referring now to FIG. 3, there is shown a containment method to prevent the actual speed ratio from running away from a target ratio when the output disk reverses direction. In FIG. 3(a), the motor vehicle comes to a stop on a grade, such as a hill. Here the target speed ratio and the actual speed ratio match up. In FIG. 3(b) the vehicle rolls back. With a conventional CVT, the actual speed ratio runs away from the target ratio. When this occurs there is not enough torque to move the motor vehicle forward.

In accordance with the principles of the present invention, with ratio containment, the actual speed ratio runs away to the underdrive condition by moving the target speed ratio toward the overdrive direction. This is accomplished by ensuring $P_H$ is higher than $P_L$ by some margin so that the piston 38 stays at the top position when the disc 22 rolls backwards. When this occurs the sleeve 50 moves in a direction opposite to the spool 46 providing containment of the speed ratio for the CVT 10. Accordingly, when the motor vehicle moves forward on the grade with ratio containment, the actual speed ratio moves to the target ratio to achieve a balanced situation.

Ratio containment can be triggered once the variator reverse rotation is detected. This detection can occur with various types of sensors that include, but are not limited to:
1. Transmission output speed sensor 200 (FIG. 1A): a directional sensor that can sense the vehicle rolling back by detecting the output shaft rotation direction, subject to the minimal speed detection limit.
2. Trunnion speed sensor 202 a directional speed sensor that can sense the vehicle rolling back by detecting the direction of the trunnion shaft rotation, subject to the minimal speed detection limit.
3. Variator trunnion pressure sensor 204: The change in difference between the piston high side pressure and the low side pressure can be employed to identify if the ratio control subsystem is behaving as a positive feedback system or a negative feedback system, which can indicate if the vehicle is rolling backwards.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for speed ratio containment for a motor vehicle continuously variable transmission (CVT) comprising:
detecting an actual speed ratio;
transmitting a command signal to a motor associated with a ratio control subsystem, the ratio control system triggering ratio containment which limits the speed ratio of a variator by commanding a speed ratio that is higher than the actual speed ratio in an overdrive direction, the ratio containment being triggered when the variator reverse direction is detected when the vehicle rolls backwards, the vehicle rolling backwards being sensed by a trunnion pressure sensor that identifies if the ratio control subsystem is behaving as a positive feedback system or a negative feedback system.

2. The method of claim 1 wherein the actual speed ratio moves to a lowest limit, which provides a maximum torque when an accelerator for the motor vehicle is engaged to resume forward motion of the motor vehicle.

3. The method of claim 1 further comprising sensing the variator reverse direction by detecting an output shaft rotation direction.

4. The method of claim 1 further comprising sensing the variator reverse direction by detecting a trunnion's shaft rotation direction.

5. The method of claim 1 further comprising applying an offset to an overdrive direction of the detected actual speed ratio.

6. The method of claim 5 further comprising employing the offset as a command speed ratio.

* * * * *